Feb. 25, 1958   G. ZOETHOUT   2,824,952
METHOD OF WELDING RAILS
Filed May 12, 1955

INVENTOR
GERRIT ZOETHOUT
BY
AGENT

United States Patent Office 2,824,952
Patented Feb. 25, 1958

2,824,952
METHOD OF WELDING RAILS

Gerrit Zoethout, Eindhoven, Netherlands, assignor, by mesne assignments, to North American Philips Company, Inc., New York, N. Y., a corporation of Delaware Application May 12, 1955, Serial No. 507,783

Claims priority, application Netherlands May 21, 1954

2 Claims. (Cl. 219—137)

For joining the end faces of rails it has been suggested to use an electric arc welding method in which a space is formed between unprepared end faces of rails, this space being enclosed by auxiliary pieces with the exception of a narrow gap, after which, without repeated interruption of the welding operation to remove slag, a welding electrode of the "low hydrogen" type is melted down by a welding arc on the bottom of the space until this space is filled with weld metal.

This method is usually carried out in three steps. First the foot of the two rail profilations are joined, with the aid of an auxiliary piece, which closes the bottom of the space to be filled with metal and with the aid of two usually low auxiliary pieces to prevent the weld metal from flowing away laterally. When the joint at the foot has been established auxiliary pieces are arranged to enclose the joint of the bodies, after which the space thus formed is filled with weld metal. Then, with the aid of suitable auxiliary pieces the joint between the head surfaces is established. The auxiliary pieces are not urged against the rails, but they leave a slit of 1 to 4 mms. open for conducting the slag away.

Although this method provides a satisfactory welding joint, it has been found that it cannot fulfill severe requirements with respect to resistance to fatigue.

According to the invention this drawback is mitigated by using a method which is characterized in that as soon as possible after the establishment of the foot joint part of the body joint is established with the aid of auxiliary pieces which surround the body joint only for part of the height. Then the remaining part of the body may be enclosed and welded, after which the joint between the head surfaces may be established with the aid of suitable auxiliary pieces.

It has been found that welded joints obtained by carrying out the method according to the invention can readily resist 2 to 3 millions of pulsations under the action of a tensile force between 2 to 17 kg./cm.$^2$ in the extreme nerve of the foot, whereas with the aforesaid known method rupture occurs after about 1.7 to 1.8 millions of pulsations. This is presumably due to the comparatively rapid cooling of the welding metal in the foot of the rail during the arrangement of the auxiliary pieces, so that a weld of lower quality is obtained. Moreover, the operator is permitted to supervise more efficiently the welded metal at least during the welding of the lower part of the body. Since small auxiliary pieces, which do not completely enclose the height of the body, are used, their arrangement requires considerably less time, so that the foot joint cannot cool excessively.

For a better understanding of the method according to the invention it should be noted that the term of unprepared end faces of the rails is to be understood to mean the ends of the rails which are not previously shaped to obtain a particular, desired profilation of the welded joint, but the surfaces of which are substantially flat and parallel to one another when the rails are in line with one another.

The generally used denomination of "welding electrodes" of the "low hydrogen type" is to be understood to mean herein welding electrodes having a core of non-alloyed or low-alloyed steel (having a maximum of 3% of alloy constituents) the coating of which contains as the most important constituents calcium fluoride and calcium carbonate, but no organic substances, while by a heating to high temperature (more than 250° C.) the moisture content is strongly reduced.

With reference to the accompanying drawing one embodiment of the invention will be described hereinafter.

Figure 1:
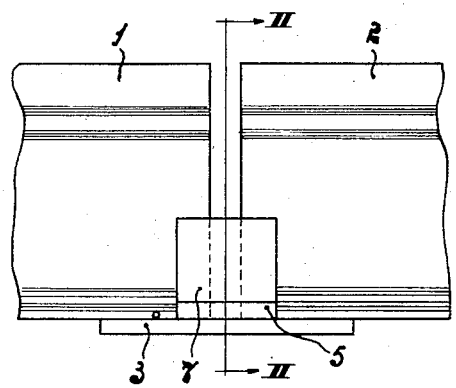
Fig. 1 is a lateral view of two rail ends 1 and 2 to be joined.
Figure 2:
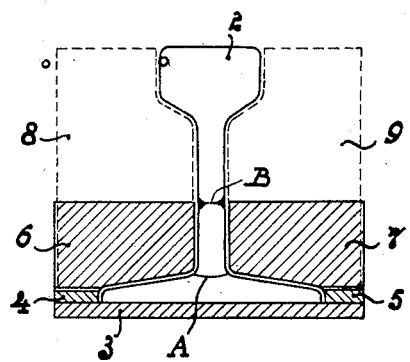
Fig. 2 is a sectional view taken on the line II—II of Fig. 1.

Reference numeral 3 designates a copper plate which initially closes the welding seam at the bottom. Reference numerals 4 and 5 designates two auxiliary pieces, also of copper, which, during the welding of the foot joint, enclose laterally the space to be filled. This space is then filled with weld metal up to the level A by melting down the end of a welding electrode of the low hydrogen type, for example a welding electrode commercially available from the N. V. Philips Lasstavenfabriek under the type of PH. 56 R, by means of a welding arc. To this end the welding electrode is moved forwards and backwards in the direction of length of the enclosed space, while, if necessary, it is swung in a direction at right angles to this direction of length. Then the auxiliary pieces 6 and 7 are rapidly arranged in a manner such that a narrow gap is left between the body of the rails and the auxiliary pieces, through which slag can flow away. As soon as these auxiliary pieces have been arranged, the welding operation is continued until the space is filled to the level B, after which the auxiliary pieces 8 and 9 (indicated by broken lines in Fig. 2) are arranged and the welding operation is continued until the space is completely filled.

Instead of replacing the auxiliary pieces 6 and 7 by auxiliary pieces 8 and 9, other auxiliary pieces for enclosing the seam may be arranged in the auxiliary pieces 6 and 7.

A welded joint obtained by carrying out this method was subjected to more than 3.1 millions of pulsations each of which caused the tensile force in the extreme nerve of the foot to fluctuate between 2 and 19 kg./cm.$^2$, without causing rupture.

What is claimed is:

1. A method of electric arc welding end surfaces of two rails positioned in end-to-end relationship comprising placing a relatively flat plate under said adjacent rail ends, arranging a first pair of auxiliary pieces on said flat plate and on either side of the juncture of said rails at the foot portions thereof and being no higher than the foot portion thereof to form a partially enclosed space, welding said rails at the foot portions thereof by means of a low hydrogen welding electrode being melted down in said space, placing a second pair of auxiliary pieces on said first pair of auxiliary pieces and adjacent to part of the body portions of said rails immediately after said foot joint has been established, both pairs of said auxiliary pieces being spaced from said rails in order to form a continuous gap therebetween, and welding part of said body portions by means of said electrode without interruption of the welding operation to remove the slag formed.

2. A method of electric arc welding end surfaces of two rails positioned in end-to-end relationship as set forth in claim 1 further comprising positioning a third pair of auxiliary pieces on said second pair of auxiliary pieces and adjacent to another part of the body portions of said rails to thereby enclose the space between said rails up to the top surfaces of said rails.

References Cited in the file of this patent

UNITED STATES PATENTS

| | | |
|---|---|---|
| 379,453 | Bernados | Mar. 13, 1888 |
| 1,868,998 | Stresau | July 26, 1932 |
| 2,395,723 | Chmielewski | Feb. 26, 1946 |

FOREIGN PATENTS

| | | |
|---|---|---|
| 596,858 | France | Aug. 17, 1925 |